US012561677B2

(12) United States Patent
Lohar et al.

(10) Patent No.: US 12,561,677 B2
(45) Date of Patent: Feb. 24, 2026

(54) SYSTEM AND METHOD FOR AUTHENTICATION OF A RESOURCE TRANSFER TARGET AFTER RESOURCE ALLOCATION

(71) Applicant: BANK OF AMERICA CORPORATION, Charlotte, NC (US)

(72) Inventors: Sanjay Arjun Lohar, Charlotte, NC (US); James J. Siekman, Charlotte, NC (US); Marabella Youkhaneh White, Charlotte, NC (US); Pamela Elizabeth Barnes, Waxhaw, NC (US); Nicholas Stephen Rose, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 24 days.

(21) Appl. No.: 18/201,427

(22) Filed: May 24, 2023

(65) Prior Publication Data

US 2024/0394692 A1     Nov. 28, 2024

(51) Int. Cl.
G06Q 20/38 (2012.01)
G06Q 20/02 (2012.01)
G06Q 20/40 (2012.01)

(52) U.S. Cl.
CPC ......... G06Q 20/3829 (2013.01); G06Q 20/02 (2013.01); G06Q 20/3825 (2013.01); G06Q 20/407 (2013.01)

(58) Field of Classification Search
CPC ................... G06Q 20/3829; G06Q 20/00–425
USPC .......................................................... 705/75
See application file for complete search history.

(56) References Cited

U.S. PATENT DOCUMENTS

| | | | |
|---|---|---|---|
| 8,194,646 B2 | 6/2012 | Elliott | |
| 8,429,630 B2 | 4/2013 | Nickolov | |
| 8,463,749 B2 | 6/2013 | Zizys | |
| 8,934,373 B2 | 1/2015 | Smith | |
| 9,288,155 B2 | 3/2016 | Uehara | |
| 9,813,924 B2 | 11/2017 | Smith | |
| 10,149,121 B2 | 12/2018 | Kim | |
| 10,582,522 B2 | 3/2020 | Cho | |
| 10,694,383 B2 | 6/2020 | Cho | |
| 10,833,865 B2 | 11/2020 | Kelly | |
| 10,985,934 B2 | 4/2021 | Shribman | |
| 11,316,254 B2 | 4/2022 | Kim | |
| 11,452,001 B2 | 9/2022 | Liao | |
| 11,452,163 B2 | 9/2022 | Park | |

(Continued)

*Primary Examiner* — Chenyuh Kuo
(74) *Attorney, Agent, or Firm* — Moore & Van Allen PLLC; Nicholas C. Russell

(57) ABSTRACT

A system is provided for authentication of a resource transfer target after resource allocation. In particular, the system may generate a secure token associated with the target of the resource transfer as part of a registration process. In this regard, the token may comprise various types of information regarding the target, which may include a cryptographic address associated with the target. Upon receiving a request to transfer a resource, the system may prompt the target to input information associated with the target and/or the resource transfer, and subsequently prompt the target to digitally sign a data record associated with the resource transfer using a private key associated with the target. Based on comparing the information provided by the user with the information obtained by the system in decrypting the data record, the system may perform authentication of the target.

20 Claims, 8 Drawing Sheets

(56)            References Cited

U.S. PATENT DOCUMENTS

| | | | | | |
|---|---|---|---|---|---|
| 11,490,291 | B2 | | 11/2022 | Talebi Fard | |
| 11,523,319 | B2 | | 12/2022 | Ryu | |
| 12,175,454 | B1 | * | 12/2024 | Kurani ............... | G06Q 20/3827 |
| 12,204,671 | B2 | * | 1/2025 | Jurat ......................... | H04L 9/50 |
| 12,294,651 | B2 | * | 5/2025 | Collen ............... | G06Q 20/3827 |
| 2019/0132138 | A1 | * | 5/2019 | Finlow-Bates ........... | H04L 9/34 |
| 2021/0022024 | A1 | | 1/2021 | Yao | |
| 2022/0021552 | A1 | | 1/2022 | Ansari | |
| 2022/0132603 | A1 | | 4/2022 | Adjakple | |
| 2022/0166586 | A1 | | 5/2022 | Kundu | |
| 2022/0201638 | A1 | | 6/2022 | Arrobo Vidal | |
| 2023/0089937 | A1 | * | 3/2023 | Singh .................. | G06Q 20/405 |
| | | | | | 705/64 |
| 2023/0104103 | A1 | * | 4/2023 | Eby .................... | G06Q 20/3678 |
| | | | | | 705/69 |
| 2023/0186291 | A1 | * | 6/2023 | Haddad ............... | G06Q 20/363 |
| | | | | | 705/64 |
| 2023/0252733 | A1 | * | 8/2023 | Herrity .................... | H04L 9/50 |
| | | | | | 345/633 |

* cited by examiner

304

NFT

RELATIONSHIP LAYER                     352

OWNERSHIP INFORMATION          352A

TOKEN LAYER                              354

TOKEN IDENTIFICATION NO.          354A

METADATA LAYER                          356

RESOURCE LOCATION               356A

RESOURCE DESCRIPTOR            356B

<descriptor 1>

<descriptor 2>

LICENSING LAYER                          358

TRANSFERABILITY PARAMETERS     358A

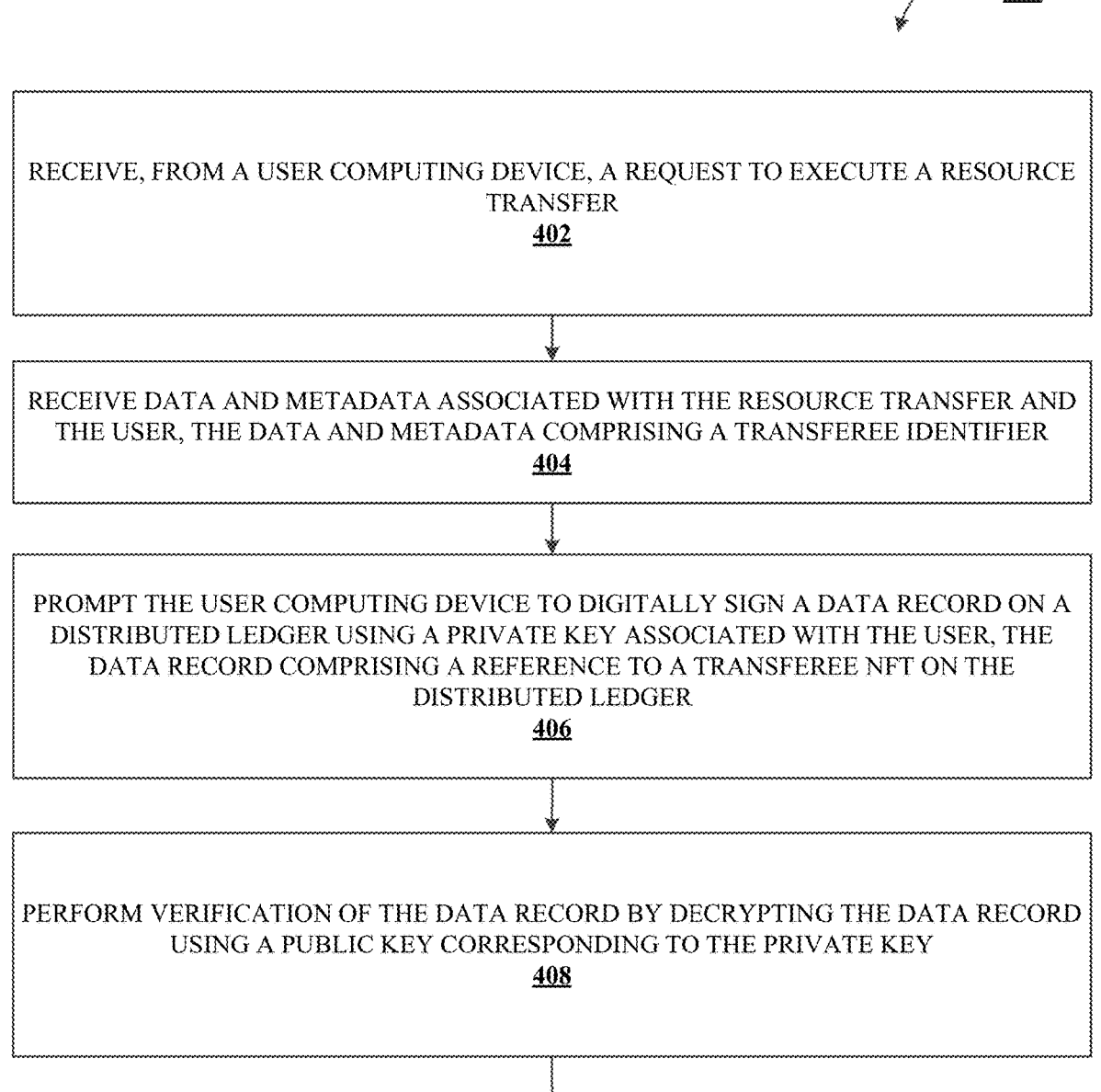

400

RECEIVE, FROM A USER COMPUTING DEVICE, A REQUEST TO EXECUTE A RESOURCE TRANSFER
402

RECEIVE DATA AND METADATA ASSOCIATED WITH THE RESOURCE TRANSFER AND THE USER, THE DATA AND METADATA COMPRISING A TRANSFEREE IDENTIFIER
404

PROMPT THE USER COMPUTING DEVICE TO DIGITALLY SIGN A DATA RECORD ON A DISTRIBUTED LEDGER USING A PRIVATE KEY ASSOCIATED WITH THE USER, THE DATA RECORD COMPRISING A REFERENCE TO A TRANSFEREE NFT ON THE DISTRIBUTED LEDGER
406

PERFORM VERIFICATION OF THE DATA RECORD BY DECRYPTING THE DATA RECORD USING A PUBLIC KEY CORRESPONDING TO THE PRIVATE KEY
408

VALIDATE THE DATA AND METADATA ASSOCIATED WITH THE RESOURCE TRANSFER AND THE USER BASED ON THE INFORMATION STORED IN THE TRANSFEREE NFT
410

FIG. 4

SYSTEM AND METHOD FOR AUTHENTICATION OF A RESOURCE TRANSFER TARGET AFTER RESOURCE ALLOCATION

TECHNOLOGICAL FIELD

Example embodiments of the present disclosure relate to a system and method for authentication of a resource transfer target after resource allocation.

BACKGROUND

There is a need for a way to securely authenticate resource transfer targets.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for authentication of a resource transfer target after resource allocation. In particular, the system may generate a secure token associated with the target of the resource transfer as part of a registration process. In this regard, the token may comprise various types of information regarding the target, which may include a cryptographic address associated with the target. Upon receiving a request to transfer a resource, the system may prompt the target to input information associated with the target and/or the resource transfer, and subsequently prompt the target to digitally sign a data record associated with the resource transfer using a private key associated with the target. Based on comparing the information provided by the user with the information obtained by the system in decrypting the data record, the system may perform authentication of the target.

Accordingly, embodiments of the present disclosure provide a system for authentication of a resource transfer target after resource allocation, the system comprising a processing device; a non-transitory storage device containing instructions when executed by the processing device, causes the processing device to perform the steps of receiving, from a user computing device, a request to execute a resource transfer; receiving data and metadata associated with the resource transfer and the user, the data and metadata comprising a transferee identifier; prompting the user computing device to digitally sign a data record on a distributed ledger using a private key associated with the user, the data record comprising a reference to a transferee NFT on the distributed ledger; performing verification of the data record by decrypting the data record using a public key corresponding to the private key; and validating the data and metadata associated with the resource transfer and the user based on information stored in the transferee NFT.

In some embodiments, validating the data and metadata comprises detecting a match between the transferee identifier with the information stored within the transferee NFT;

and executing the resource transfer according to one or more parameters specified within the request to execute the resource transfer.

In some embodiments, validating the data and metadata comprises detecting a mismatch between the transferee identifier with the information stored within the transferee NFT; and executing one or more remediation processes, the one or more remediation processes comprising blocking the resource transfer.

In some embodiments, the one or more remediation processes comprises transmitting a notification to the user computing device, the notification comprising an indication that the user is not authorized to execute the resource transfer.

In some embodiments, receiving the request to execute the resource transfer comprises detecting that the user has interacted with a selectable element of a virtual representation of the resource within the virtual environment.

In some embodiments, the selectable element as a virtual button appearing proximate to the virtual representation of the resource.

In some embodiments, the data and metadata further comprise a resource identifier, transaction timestamp, and a transferee address.

Embodiments of the present disclosure also provide a computer program product for authentication of a resource transfer target after resource allocation, the computer program product comprising a non-transitory computer-readable medium comprising code causing an apparatus to perform the steps of receiving, from a user computing device, a request to execute a resource transfer; receiving data and metadata associated with the resource transfer and the user, the data and metadata comprising a transferee identifier; prompting the user computing device to digitally sign a data record on a distributed ledger using a private key associated with the user, the data record comprising a reference to a transferee NFT on the distributed ledger; performing verification of the data record by decrypting the data record using a public key corresponding to the private key; and validating the data and metadata associated with the resource transfer and the user based on information stored in the transferee NFT.

In some embodiments, validating the data and metadata comprises detecting a match between the transferee identifier with the information stored within the transferee NFT; and executing the resource transfer according to one or more parameters specified within the request to execute the resource transfer.

In some embodiments, validating the data and metadata comprises detecting a mismatch between the transferee identifier with the information stored within the transferee NFT; and executing one or more remediation processes, the one or more remediation processes comprising blocking the resource transfer.

In some embodiments, the one or more remediation processes comprises transmitting a notification to the user computing device, the notification comprising an indication that the user is not authorized to execute the resource transfer.

In some embodiments, receiving the request to execute the resource transfer comprises detecting that the user has interacted with a selectable element of a virtual representation of the resource within the virtual environment.

In some embodiments, the selectable element as a virtual button appearing proximate to the virtual representation of the resource.

Embodiments of the present disclosure also provide a computer-implemented method for authentication of a resource transfer target after resource allocation, the computer-implemented method comprising receiving, from a user computing device, a request to execute a resource transfer; receiving data and metadata associated with the resource transfer and the user, the data and metadata comprising a transferee identifier; prompting the user computing device to digitally sign a data record on a distributed ledger using a private key associated with the user, the data record comprising a reference to a transferee NFT on the distributed ledger; performing verification of the data record by decrypting the data record using a public key corresponding to the private key; and validating the data and metadata associated with the resource transfer and the user based on information stored in the transferee NFT.

In some embodiments, validating the data and metadata comprises detecting a match between the transferee identifier with the information stored within the transferee NFT; and executing the resource transfer according to one or more parameters specified within the request to execute the resource transfer.

In some embodiments, validating the data and metadata comprises detecting a mismatch between the transferee identifier with the information stored within the transferee NFT; and executing one or more remediation processes, the one or more remediation processes comprising blocking the resource transfer.

In some embodiments, the one or more remediation processes comprises transmitting a notification to the user computing device, the notification comprising an indication that the user is not authorized to execute the resource transfer.

In some embodiments, receiving the request to execute the resource transfer comprises detecting that the user has interacted with a selectable element of a virtual representation of the resource within the virtual environment.

In some embodiments, the selectable element as a virtual button appearing proximate to the virtual representation of the resource.

In some embodiments, the data and metadata further comprise a resource identifier, transaction timestamp, and a transferee address.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
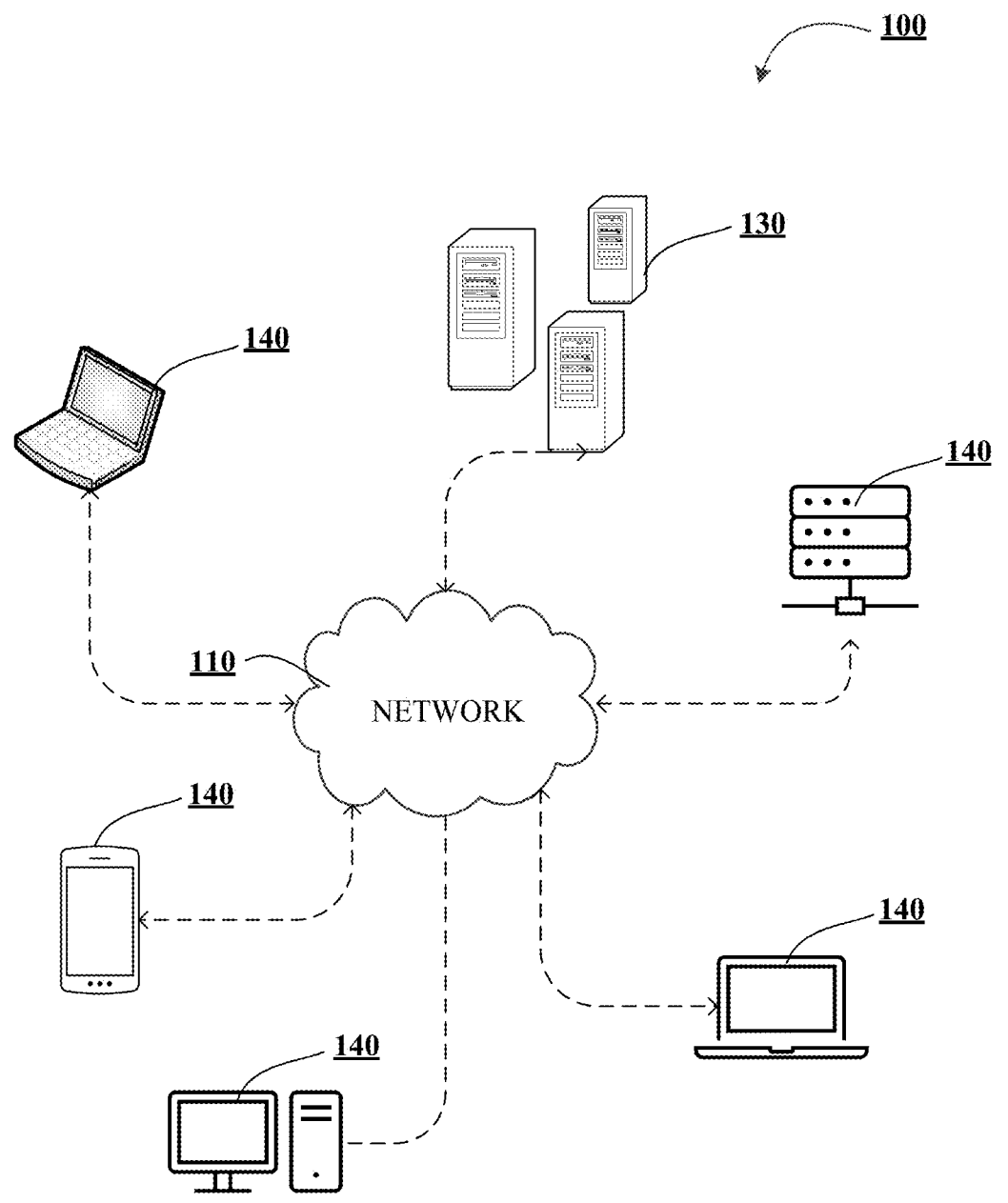
Figure 1B:
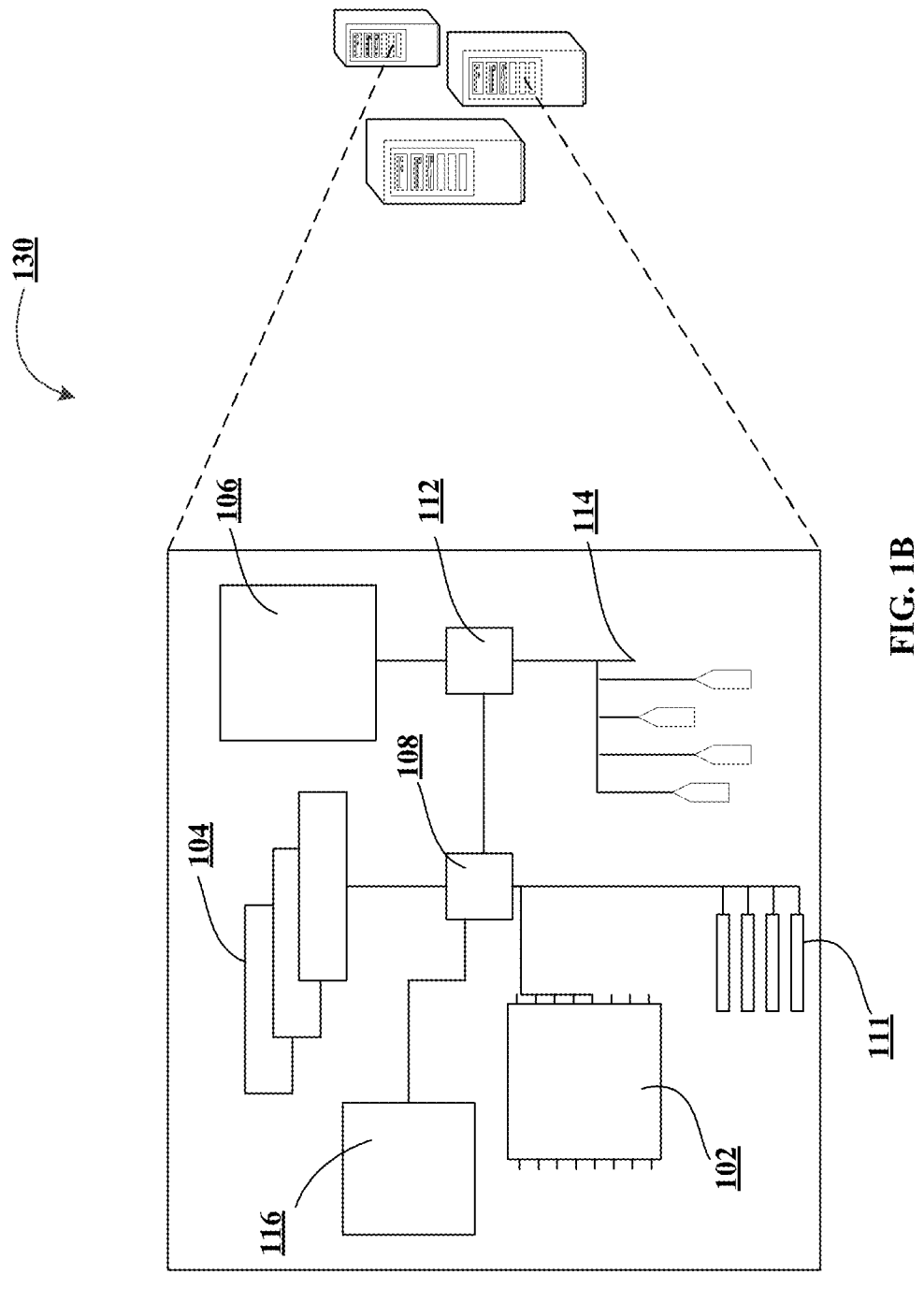
Figure 1C:
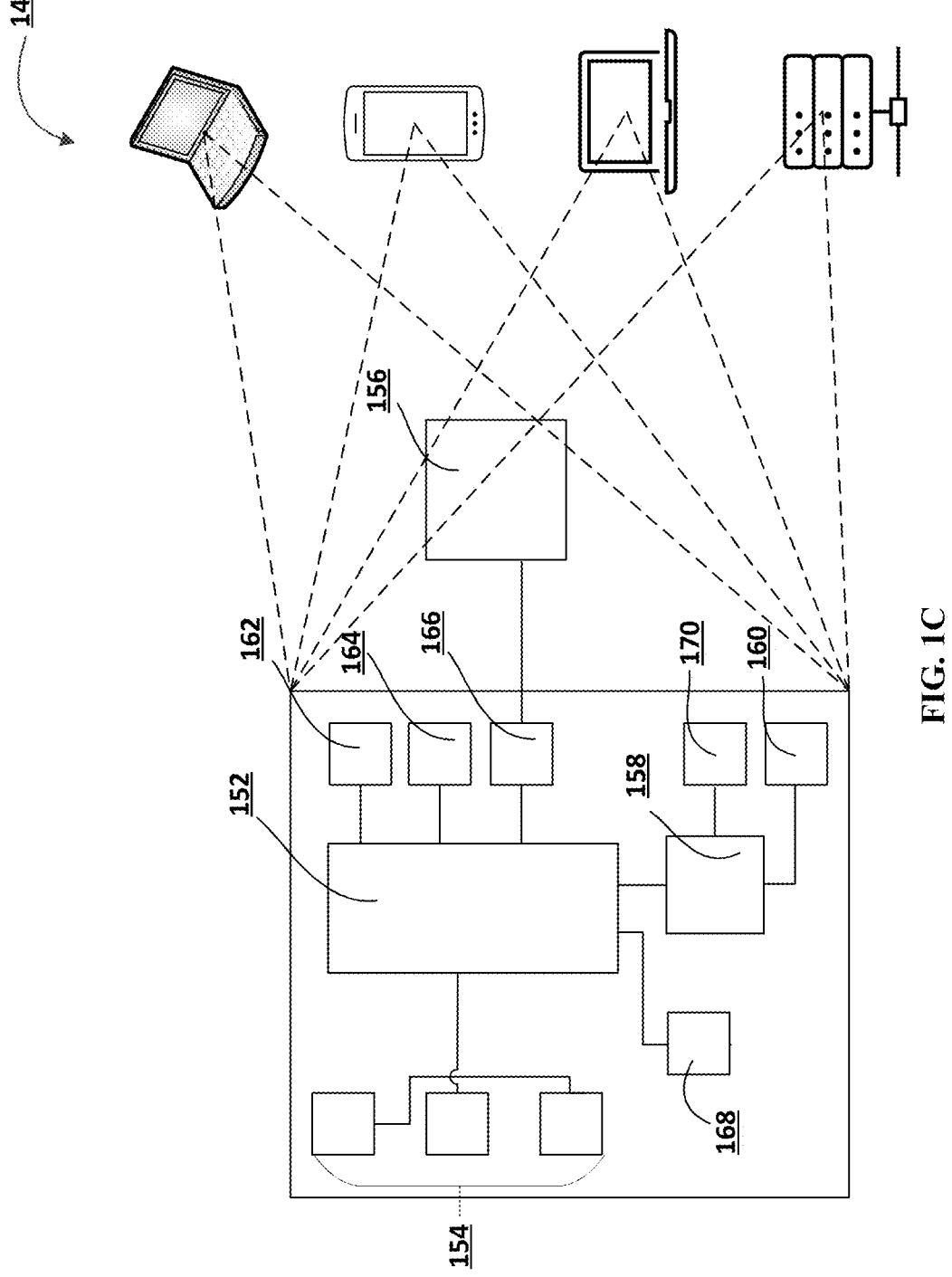
Figure 2A:
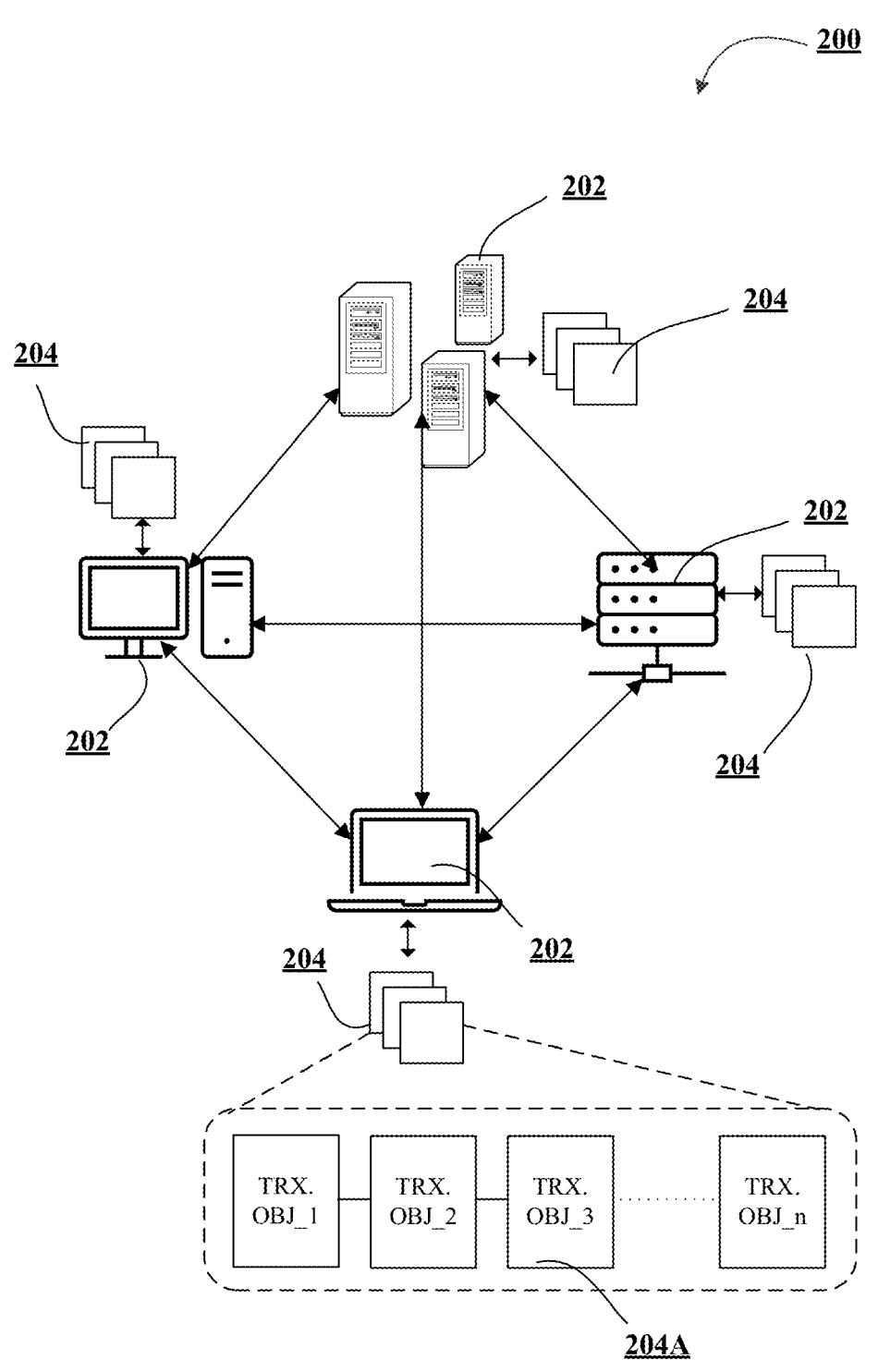
Figure 2B:
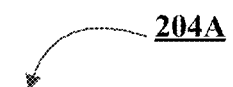
Figure 2B:
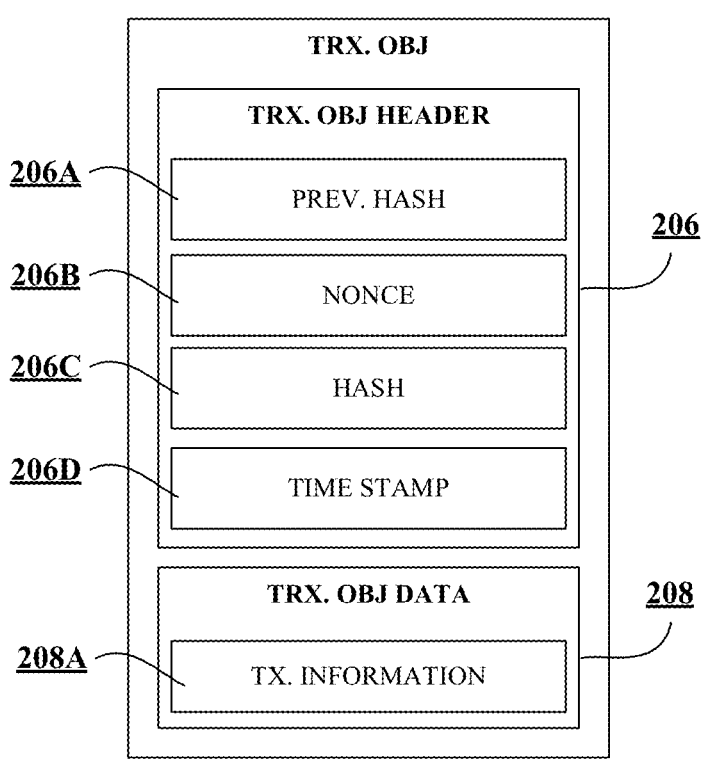
Figure 3A:
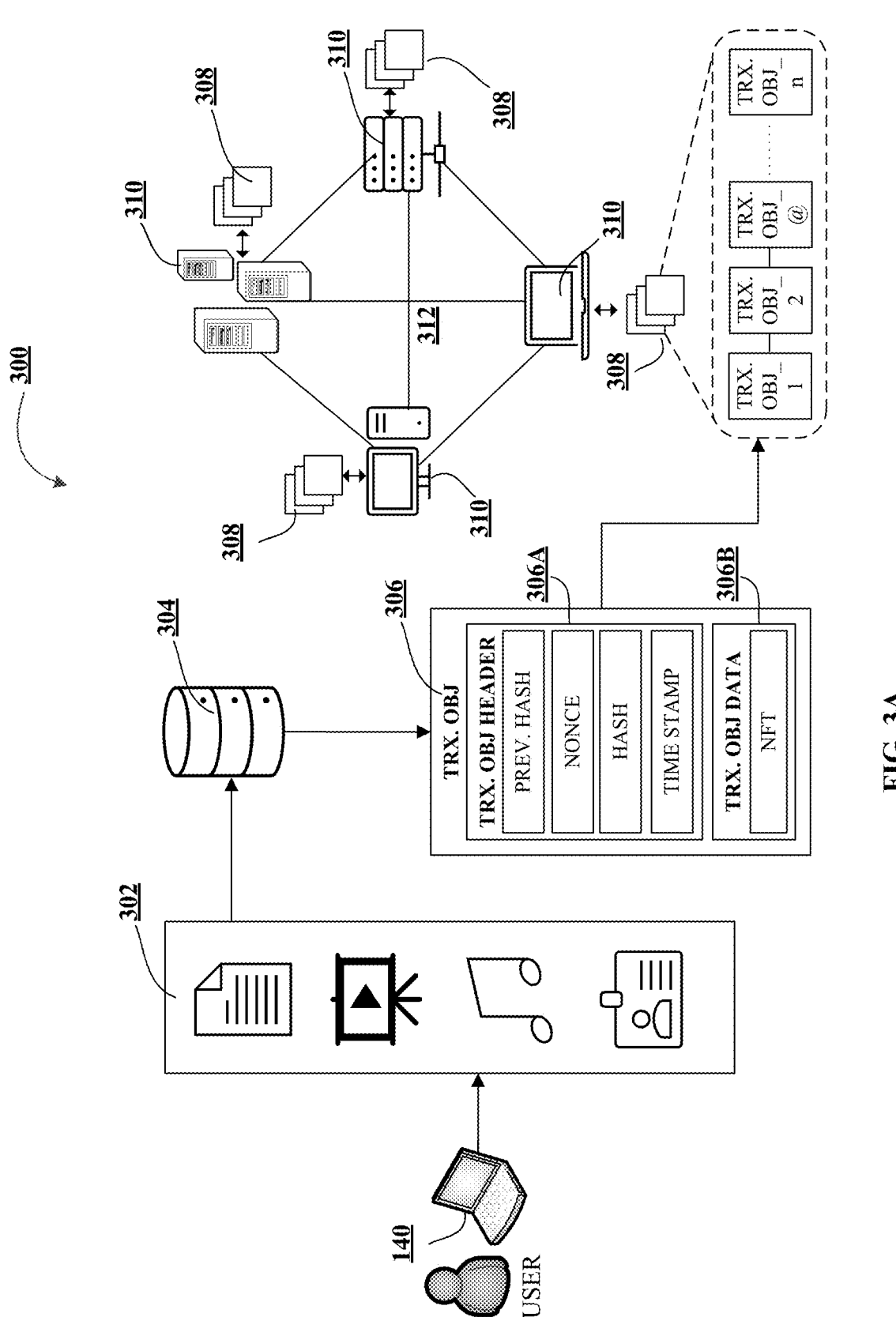
Figure 3B:

FIGS. 1A-1C illustrates technical components of an exemplary distributed computing environment for authentication of a resource transfer target after resource allocation, in accordance with an embodiment of the disclosure;

FIG. 2A illustrates an exemplary DLT architecture, in accordance with an embodiment of the disclosure;

FIG. 2B illustrates an exemplary transaction object within the DLT architecture, in accordance with an embodiment of the disclosure;

FIG. 3A illustrates an exemplary process for creating an NFT, in accordance with an embodiment of the disclosure;

FIG. 3B illustrates an exemplary NFT as a multilayered documentation of a resource, in accordance with an embodiment of the disclosure;

FIG. 4 illustrates a method for authentication of a resource transfer target after resource allocation, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like. In yet other embodiments, the resources may include real-world goods or commodities that may be acquired and/or exchanged by a user.

As used herein, "metaverse" or "virtual environment" may refer to a unitary, persistent computer-generated interactive environment or space that may be accessible by one or more users. The metaverse may incorporate various technologies in creating and/or maintaining the environment, such as virtual reality, augmented reality, and/or distributed ledger technologies. Accordingly, users may access the metaverse to interact with other users, acquire and/or exchange resources, engage with virtual experiences and/or learning activities, conduct business, and/or the like.

Metaverse, as an evolving paradigm of the next generation Internet, aims to build a fully immersive, and self-sustaining virtual shared space for humans to play, work, and socialize. That said, security and privacy concerns (often inherited from underlying technologies or emerged in the new digital ecology) of metaverse may impede its wide deployment. For example, a number of different challenges may arise when a user initiates a transfer of a resource within the metaverse (e.g., an exchange of a real or virtual resource with another real or virtual resource). For instance, both the transferor and transferee of the resource may wish to validate and/or authenticate the identity of one another (e.g., the transferor may wish to verify the transferee as the intended recipient, and the transferee may wish to verify the transferor as an authorized provider of the resource). Furthermore, the transferee/recipient of the resource may wish to verify the authenticity of the resource after receipt, whether the resource is real or virtual. Accordingly, there is a need for a secure and efficient way to execute and/or facilitate the transfer of resources within a virtual environment.

To address the above concerns among others, the system described herein provides a way to perform validation and authentication of resources transferred through the virtual environment as well as the various parties (e.g., users, entities, computing systems, and/or the like) associated with the transfer of the resource. To illustrative an exemplary scenario, a user may log onto the virtual environment to initiate a transfer of a resource (the resource to be transferred to the user may be referred to as a "target resource." The user may initiate the transfer, for instance, by visiting a virtual hub or storefront that may provide various resources that are available to be transferred, and selecting the target resource from within the virtual hub. In this regard, the transfer of the resource may include an exchange of the target resource with a user supplied resource (e.g., a sum of digital currency or tokens, a fund transfer, and/or the like). In some embodiments, the target resource may be a virtual object or product (e.g., a virtual avatar, virtual good, accessories, tokens or tickets, and/or the like). In other embodiments, the target resource may be a real-world/tangible object such as a product or good that may be acquired by the user as a result of the resource transfer.

The participants of the resource transfer (e.g., the transferor and transferee) as well as the target resource may each be associated a unique identifier within the system. For instance, the transferor and transferee may each be associated with a cryptographic address (e.g., a distributed ledger address). In such embodiments, the unique identifier associated with the resource may be a non-fungible cryptographic token ("resource NFT") that may be generated by a smart contract and stored within a distributed ledger. In some embodiments, the smart contract for minting the resource NFT may specify the owner of the resource NFT as an administrative entity (e.g., a third party entity that may facilitate the transfer of the resource between the transferor and the transferee).

In some embodiments, NFTs may be also minted for the transferor ("transferor NFT") and/or the transferee ("transferee NFT"), where the smart contracts for such NFTs may specify certain information about the transferor or transferee, as will be described in further detail herein. The system described herein may be used, in some embodiments, by a third party entity that may serve as an intermediary or clearinghouse for the resource transfers executed using the system.

Authentication of the Transferor

Through the use of the transferor NFT, the system may allow users to safely and efficiently perform authentication of the transferor of the resource. In this regard, the resource as viewed by the user from within the virtual environment may be associated with an interactable element (e.g., a visible token, badge, code, and/or the like) that, when interacted with by the user (e.g., by selecting or touching the interactable element from within the virtual environment, by using a virtual scanner configured to read the information within the interactable element, and/or the like), causes the system to retrieve and/or present information to the user on which entities have been authorized to transfer the target resource. In some embodiments, the list of authorized transferors may have been defined within the smart contract associated with the target resource (e.g., by defining the list of cryptographic addresses that are authorized to transfer the resource, which may include the transferor's cryptographic address).

Accordingly, in some embodiments, an asymmetric cryptographic key pair may be generated for each authorized transferor and associated with the cryptographic address associated with the authorized transferor. The transferor private key may be held and used exclusively by the authorized transferor, whereas the public key may be distributed to one or more third parties. The authorized transferor may publish an initial data record (e.g., the transferor NFT) to the distributed ledger that has been digitally signed using the transferor private key such that third parties may validate the data record (e.g., by decrypting the data record using the transferor public key).

Once the initial data record for validating the identity of the transferor has been stored in the distributed ledger, the resource NFT may comprise a link or reference to the initial data record on the distributed ledger for each authorized transferor. In other words, the resource NFT may define (e.g., through the smart contract) the list of entities that are authorized to transfer the resource. Accordingly, when a user accesses information about the resource (e.g., by viewing the resource NFT), the system may verify the identity of the transferor against the list of authorized transferors as defined in the resource NFT. For instance, the system may read the cryptographic address of the transferor and verify whether the cryptographic address is listed in the resource NFT. If a match is detected, the system may determine that the transferor is an authorized transferor of the resource associated with the resource NFT. In such a scenario, the system may present a notification to the user (e.g., by displaying a message or alert to the user through a virtual reality display or head-mounted display operated by the user) that the transferor is an authorized transferor. On the other hand, if no match is detected, the system may determine that the transferor is not an authorized transferor of the resource and subsequently take one or more remediation actions. The remediation actions may include, for instance, automatically blocking the resource transfer from occurring (e.g., by rejecting data records submitted to the distributed ledger from the transferor). The system may further display a notification to the user that the transferor is an unauthorized transferor.

In some embodiments, the authorization of the transferor to transfer the resource may be limited by the resource NFT. For instance, the resource NFT may define limitations such as a limit on the number of units of the resource that may be transferred by a given authorized transferor. Furthermore, the transferor may be authorized to transfer certain resources but not others. By setting permissions in this manner, the system may grant granular control over the transfer of the resource to the creator of the resource NFT.

Over time, the administrative entity may wish to add newly authorized transferors and/or remove existing permissions from currently authorized transferors. In such cases, the entity may submit a data record to the distributed ledger, where the data record references the original resource NFT. Once the data record has been validated and appended to the distributed ledger, a permanent record of the change in permissions may be established.

An exemplary embodiment is provided as follows. It should be understood that the following example is provided for illustrative purposes only and is not intended to restrict the scope of the disclosure. In one embodiment, a user may log into the virtual environment to visit a virtual storefront or hub of a distributing entity (e.g., transferor) that may offer various resources or products (e.g., real or virtual clothing items that may be purchased using fiat and/or digital currency). The user may select a particular resource (e.g., a pair of shoes) to verify whether the distributing entity is authorized to sell the resource.

Upon receiving the selection from the user, the system may access the resource NFT associated with the selected resource and retrieve the list of authorized transferors, where the list of authorized transferors may include one or more cryptographic addresses. The system may then retrieve the cryptographic address associated with the transferor and compare the cryptographic address against the list of authorized transferors found in the resource NFT. If a match is found, the system may prompt the distributing entity's system to submit a data record to the distributed ledger that has been signed using the private key associated with the cryptographic address of the transferor. The system may then decrypt the signature of the data record using the public key associated with the cryptographic address of the transferor. If the system is able to successfully decrypt the signature, the system may determine that 1) the cryptographic address provided by the transferor is listed as an authorized transferor of the resource; and 2) the entity offering the resource for sale is indeed the authorized transferor associated with the cryptographic address. Upon making such determinations, the system may present a notification to the user, where the notification may comprise a message indicating that the owner of the storefront/hub is an authorized seller of the selected product.

Tokenization for Authentication of the Resource

The system as described herein further provides for verification by the user of authenticity of the resource to be acquired. Accordingly, as described above, a resource NFT may be generated for each resource to be tracked and/or transferred through the system. In this regard, the owner of the resource NFT may be set by the smart contract to be a cryptographic address associated with an entity that may possess certain ownership rights to the resource to be transferred. For instance, in embodiments in which the resource is a product or item, the entity may be a manufacturer, distributor, licensor, or any other type of entity that may be able to validate the authenticity of a particular product or item.

Accordingly, a user who is considering a purchase of a particular product or good may wish to verify with the entity that the product is authentic. Continuing the above example, the user may select a target resource to be authenticated. Upon detecting that the user has selected the target resource, the system may transmit a request to the entity's servers to authenticate the target resource. The request to authenticate the target resource may comprise data and/or metadata associated with the resource, including information that may be defined within the resource NFT, such as a resource identifier, creation date, ownership information, authorized transferor information, and/or the like.

Based on the data and/or metadata associated with the target resource, the entity's systems may perform a verification of the data and/or metadata to determine whether the resource is genuine. For instance, the entity's system may read the resource identifier (which may be an alphanumeric string such as a cryptographic hash value) and compare the resource identifier against an authorized resource database that contains resource identifier values of authorized, authenticated resources. In some embodiments, the authorized resource database may be stored across one or more data records within the distributed ledger. In such embodiments, the authentication of the resource identifier may include an on-chain verification by comparing the resource identifier with the authorized resource identifiers stored on the distributed ledger.

If the entity's system detects a match between the resource identifier and the values within the authorized resource database, the entity's system may publish a data record on the distributed ledger that references the resource identifier and identifies the resource as authentic. The data record may be digitally signed using the private key associated with the cryptographic address of the entity (e.g., the cryptographic address designated as the owner of the resource NFT). Accordingly, once the data record authenticating the resource has been published to the distributed ledger, the system may detect that the data record has been published and perform verification of the data record by decrypting the digital signature using the public key corresponding with the private key of the entity. If the decryption is successful, the system may present a notification to the user (e.g., by a pop-up message displayed within the field of view of the user within the virtual environment) indicating that the resource has been authenticated by the entity. In this way, the user may be able to verify the authenticity of a product directly with the entity that has created the product.

On the other hand, if the entity system detects that the resource identifier does not match any of the values within the authorized resource database, the entity may publish a data record to the distributed ledger that references the resource identifier and indicates that the resource associated with the resource identifier is not genuine. Accordingly, the system may, based on the data record, present a notification to the user that the resource is not genuine. The system may further prevent the resource from being transferred to the user or any other future users. The data record indicating the nongenuine status of the resource may be persistent within the distributed ledger. Accordingly, in some embodiments, the initial authentication check may comprise a search of the data records within the distributed ledger to check whether the resource identifier has been flagged as nongenuine. If the system detects that such a data record exists, the system may automatically reject the resource transfer without transmitting the authentication request to the entity systems, thereby preventing the unnecessary use of computing resources of the entity's systems.

Authentication of the Transferee

The system described herein further provides for authentication of the user as the intended recipient of the resource. In this regard, as described above, the system may generate a transferee NFT associated with the user, where the transferee NFT may be created as part of a user onboarding process. The transferee NFT may include various types of information regarding the user, such as the name of the user, a registered address of the user, user contact information, a cryptographic address associated with the user (e.g., a cryptocurrency wallet), and/or the like. In particular, the transferee NFT may designate the cryptographic address associated with the user as the owner of the transferee NFT, where the cryptographic address is associated with an asymmetric key pair (e.g., a private key and public key). The private key may be held and used exclusively by the user.

Continuing the above example, the transferor or merchant that is selling the resource may wish to verify that the user is the authorized and valid recipient of the resource. Accordingly, when the user requests to transfer the resource (e.g., the user has submitted a purchase request within the virtual environment), the system may prompt the user to input information related to the user and/or the transfer. Such information may include, for instance, the name of the user, the address of the user, contact information, and/or the like.

Once the system has received the requested information from the user, the transferor may prompt the user to digitally sign a data record associated the resource transfer with the private key associated with the user. In some embodiments, the system may cause the user device associated with the user (e.g., a virtual reality system or head-mounted device) to automatically sign the data record using a private key stored within the user device. If the user or user device fails to provide the private key, the system may flag the resource transfer and/or the user as being a non-authorized recipient and automatically block the resource transfer from being executed.

Upon detecting that the data record has been digitally signed, the system may decrypt the signature using the public key corresponding with the user's private key and view the transferor NFT associated with the cryptographic address of the user. Subsequently, the system may compare the information within the transferor NFT with the information received from the user as part of the resource transfer request. If the information matches, the system may determine that the user is an authorized recipient of the resource and transmit a notification to the transferor system indicating that the user is an authorized recipient. At this point, the transferor may execute the transfer of the resource. On the other hand, if the system detects a mismatch of information, the system may determine the user to be a potential unauthorized recipient and take one or more remediation actions. For instance, the system may prompt the user to enter the requested information once more (e.g., in case the user has made an error in the provided information). In other instances, the system may automatically block the resource from being transferred to the user and/or lock the user from submitting resource transfer requests for a set duration (e.g., one day). In other embodiment, the system may lock the user from submitting resource transfer requests until the user performs an additional verification step (e.g., submitting identifying documents). In this way, the system may provide a secure and reliable way to verify the identity of the recipient of a resource transfer.

In some instances, the user may wish to change or update the information provided in the original transferor NFT. For example, the user may have moved recently and may wish to update the address associated with the user's account. In such cases, the user may submit a data record (e.g., through the user device) to the distributed ledger containing the updated address information and referencing the original transferor NFT. The user may digitally sign the data record using the user's private key to authenticate the transaction. In this way, the distributed ledger may contain a durable record of all of the updates to the transferor NFT.

Processing a Resource Transfer Between a Virtual and Real Environment

In some scenarios, the resource transfer may be a transfer of a real world product that has been initiated within a virtual environment. Continuing the above example, the user may visit a virtual storefront and purchase a resource within the virtual environment, where the resource may be a real world product (e.g., an item of clothing). In such cases, the transferor (e.g., seller) of the product may wish to verify that the intended recipient has received the product in the real world.

Accordingly, the system disclosed herein further provides for verification that the intended transferee has received the resource. In this regard, upon detecting that the product has arrived at the address designated in the request for the resource transfer (e.g., by retrieving delivery information using a tracking number of the courier that is delivering the product), the system may prompt the user and/or user device to provide a receipt confirmation to the transferor and/or the system. In some embodiments, the receipt confirmation may take the form of a data record submitted by the user (e.g., through a user device such as a smartphone) to the distributed ledger, where the data record may comprise an indication that the resource has been received along with additional information regarding the resource and/or the resource transfer. The additional information may comprise, for instance, a description of the resource received (e.g., make and/or model information, serial number, and/or the like), purchase price, delivery address, name of the transferee, transaction timestamp, and/or the like.

The data record may be digitally signed using the private key associated with the user. Accordingly, the system may verify the identity of the transferee by attempting to decrypt the data record using the public key associated with the original purchaser of the product. If the system is able to successfully decrypt the data record, the system may determine that the original requestor of the resource is the same user or entity as the recipient of the resource that has submitted the data record confirming receipt of the resource. Accordingly, the system may subsequently mark the resource transfer as having been successfully completed.

On the other hand, if the system is unable to successfully decrypt the data record, the system may determine that someone other than the intended recipient has received the resource. Subsequently, the system may determine that an error has occurred with the resource transfer (e.g., a mis-delivery of the resource) and transmit a notification to the transferor that the error has occurred. The notification may further comprise a description of the error as well as recommendations for remediating the error. For instance, if the error is a mis-delivered item, the system may recommend that the transferor verify the shipping address and re-ship the product to the intended recipient. In this way, the system may provide an efficient way to verify that the transferee of a resource transfer has successfully received the resource.

Creation and Monitoring of Unique Token on Real-Word Resource

As described above, the user may verify receipt of the resource by uploading a data record to the distributed ledger confirming receipt of the resource. In this regard, the resource itself may comprise one or more physical features that may facilitate the verification of receipt by the user as well as authentication of the physical resource to the user. To this end, the product (or the packaging for the product) may comprise a scannable region that may be scanned by a sensing device of the user device (e.g., a camera, code reader, RFID receiver, and/or the like). Once the scannable region is scanned, the user device may retrieve at least a portion of the information needed to perform receipt verification of the resource (e.g., a description of the resource received, purchase price, delivery address, name of the transferee, transaction timestamp, and/or the like). In some embodiments, the additional information may be embedded within the scannable region. In other embodiments, decoded data read from the scannable region may contain a resource link (e.g., a pointer) to the additional information which may be stored on a remote server. Accordingly, the data record may be automatically populated using the information obtained by scanning the scannable region of the product.

In some embodiments, the scannable region may take the form of an attachment to the product or product packaging (e.g., a sticker, patch, label, and/or the like). In other embodiments, the scannable region may take the form of a woven pattern on the surface of the product in a designated area (e.g., on an interior-facing surface of a shirt). In such embodiments, the user device may be configured to recognize certain patterns within the scannable region (e.g., thread patterns, rivet patterns, and/or the like) that may be decoded and interpreted by the user device and translated to data that may be used to generate the receipt verification data record.

In some embodiments, the scannable region may further provide a way for the user to authenticate the product. In this regard, once the user device has verified that the transferor is an authorized transferor, the system may store a preshared key associated with the transferor and/or resource transfer on the user device at the time of the resource transfer. Once the user receives the resource, the user device may be used to scan the scannable region to check for the presence of an authentication key within the data retrieved from scanning the scannable region. If an authentication key is detected, the authentication key may be compared to the preshared key stored on the user device. If a match is detected, the user device may determine that the resource is authentic, and subsequently present a notification on the user device indicating that the resource is authentic. However, if a mismatch is detected or if no authentication key is found from scanning the scannable region, the user device may determine that the resource may be non-authentic. Subsequently, the user device may present a notification to the user that the resource may be non-authentic.

In an alternative embodiment, the product may comprise an embedded chip instead of a scannable region, where the chip may comprise a wireless communication interface for communicating with the user device (e.g., RFID, Wi-Fi, Bluetooth, and/or the like). In such embodiments, the user device may detect the presence of the chip through the wireless communication device of the user device and attempt to establish a communication channel with the chip. Accordingly, once the communication channel has been established, the user device may check whether the authentication key is stored on the chip.

Self-Authentication for a Resource Transfer Request

It should be noted that the processes described herein may be self-executing upon receiving a resource transfer request from the user. In this regard, each of the authentication/verification processes may be implemented as self-executing smart contracts stored on the distributed ledger. Continuing the above example, the user may select a resource to be acquired from within the virtual environment and submit a resource transfer request in the form of a data record published to the distributed ledger. The data record may comprise information related to the resource transfer request, such as transferor information, transferee information, resource-related information, transaction details and/or timelines, and/or the like. Once the data record has been published, a smart contract may be configured to perform verification of the transferor as described above (e.g., by performing verification using the transferor NFT).

Once the transferor has been authenticated, the smart contract may further be configured to perform authentication of the transferee (e.g., by performing verification of the buyer using the transferee NFT). The smart contract may further be configured to perform authentication of the resource using the resource NFT.

If all of the verification checks are successful, the smart contract may be configured to automatically execute the resource transfer according to the parameters defined in the resource transfer request. In this regard, the smart contract may arrange the exchange of resources between the transferor and transferee. However, if one or more of the verification checks are unsuccessful, the smart contract may be configured to terminate the resource transfer. In some embodiments, the smart contract may further be configured to present an error message to the transferor system and/or the user device indicating that the resource transfer has failed and a description of the reason for the failure (e.g., the resource could not be authenticated).

The system as described herein provides a number of technological benefits over conventional resource authentication systems. In particular, by performing verification of a user through data records on a distributed ledger, the system may ensure that computing resources are not expended on fulfilling unauthorized requests.

FIGS. 1A-1C illustrate technical components of an exemplary distributed computing environment 100 for the system for authentication of a resource transfer target after resource allocation. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

An NFT is a cryptographic record (referred to as "tokens") linked to a resource. An NFT is typically stored on a distributed ledger that certifies ownership and authenticity of the resource, and exchangeable in a peer-to-peer network.

FIG. 3A illustrates an exemplary process of creating an NFT 300, in accordance with an embodiment of the invention. As shown in FIG. 3A, to create or "mint" an NFT, a user (e.g., NFT owner) may identify, using a user input device 140, resources 302 that the user wishes to mint as an NFT. Typically, NFTs are minted from digital objects that represent both tangible and intangible objects. These resources 302 may include a piece of art, music, collectible, virtual world items, videos, real-world items such as artwork and real estate, or any other presumed valuable object. These resources 302 are then digitized into a proper format to produce an NFT 304. The NFT 304 may be a multi-layered documentation that identifies the resources 302 but also evidences various transaction conditions associated therewith, as described in more detail with respect to FIG. 3A.

To record the NFT in a distributed ledger, a transaction object 306 for the NFT 304 is created. The transaction object 306 may include a transaction header 306A and a transaction object data 306B. The transaction header 306A may include a cryptographic hash of the previous transaction object, a nonce—a randomly generated 32-bit whole number when the transaction object is created, cryptographic hash of the current transaction object wedded to the nonce, and a time stamp. The transaction object data 306B may include the NFT 304 being recorded. Once the transaction object 306 is generated, the NFT 204 is considered signed and forever tied to its nonce and hash. The transaction object 306 is then deployed in the distributed ledger 308. At this time, a distributed ledger address is generated for the transaction object 306, i.e., an indication of where it is located on the distributed ledger 308 and captured for recording purposes. Once deployed, the NFT 304 is linked permanently to its hash and the distributed ledger 308, and is considered recorded in the distributed ledger 308, thus concluding the minting process As shown in FIG. 3A, the distributed ledger 308 may be maintained on multiple devices (nodes) 310 that are authorized to keep track of the distributed ledger 308. For example, these nodes 310 may be computing devices such as system 130 and end-point device(s) 140. One node 310 may have a complete or partial copy of the entire distributed ledger 308 or set of transactions and/or transaction objects on the distributed ledger 308. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 3B illustrates an exemplary NFT 304 as a multi-layered documentation of a resource, in accordance with an embodiment of an invention. As shown in FIG. 3B, the NFT may include at least relationship layer 352, a token layer 354, a metadata layer 356, and a licensing layer 358. The relationship layer 352 may include ownership information 352A, including a map of various users that are associated with the resource and/or the NFT 304, and their relationship to one another. For example, if the NFT 304 is purchased by buyer B1 from a seller S1, the relationship between B1 and S1 as a buyer-seller is recorded in the relationship layer 352. In another example, if the NFT 304 is owned by O1 and the resource itself is stored in a storage facility by storage provider SP1, then the relationship between O1 and SP1 as owner-file storage provider is recorded in the relationship layer 352. The token layer 354 may include a token identification number 354A that is used to identify the NFT 304. The metadata layer 356 may include at least a file location 356A and a file descriptor 356B. The file location 356A may provide information associated with the specific location of the resource 302. Depending on the conditions listed in the smart contract underlying the distributed ledger 308, the resource 302 may be stored on-chain, i.e., directly on the distributed ledger 308 along with the NFT 304, or off-chain, i.e., in an external storage location. The file location 356A identifies where the resource 302 is stored. The file descriptor 356B may include specific information associated with the source itself 302. For example, the file descriptor 356B may include information about the supply, authenticity, lineage, provenance of the resource 302. The licensing layer 358 may include any transferability parameters 358B associated with the NFT 304, such as restrictions and licensing rules associated with purchase, sale, and any other types of transfer of the resource 302 and/or the NFT 304 from one person to another. Those skilled in the art will appreciate that various additional layers and combinations of layers can be configured as needed without departing from the scope and spirit of the invention.

FIG. 4 illustrates a method 400 for authentication of a resource transfer target after resource allocation, in accordance with an embodiment of the disclosure. As shown in block 402, the method includes receiving, from a user computing device, a request to execute a resource transfer. In an exemplary embodiment, a user may submit a request to purchase a product within a virtual environment (e.g., a virtual storefront). In such an embodiment, authorized users may be onboarded by the system before the user is permitted to request resource transfers. The onboarding process may comprise generating a transferee NFT and storing the transferee NFT on the distributed ledger, where the transferee NFT comprises information associated with the user, such as a user or transferee identifier, user address, contact information, and/or the like.

After being registered, the user may select a product by interacting with a selectable element or area within or otherwise linked to a virtual representation of the product or resource. For instance, the selectable element may comprise an interior space of the virtual representation, such that the user may interact with the selectable element by moving a control device into the interior space of the virtual representation of the resource. In other embodiments, the selectable element may comprise a virtual button, switch, lever, or other switchable element that may appear adjacent or proximate to the virtual representation of the resource. Upon detecting that the user has selected the resource to be transferred, the system may prompt the user to input information regarding the resource transfer and/or the user. In alternative embodiments, the user computing device may automatically provide the requested information based on being queried by the system.

Next, as shown in block 404, the method includes receiving data and metadata associated with the resource transfer and the user, the data and metadata comprising a transferee identifier. The data and metadata may include, for instance, a resource identifier, a transferee address, transaction timestamp, and/or the like. In some embodiments, the system may, upon receiving the transferee identifier, search the distributed ledger for a transferee NFT that matches the transferee identifier. If no match is found, the system may determine that the user is not authorized to complete the resource transfer and execute one or more remediation processes. The remediation processes may include, for instance, blocking the resource transfer and transmitting a notification to the user computing device indicating that the user is not authorized to make the resource transfer. If a match is found, the process may proceed to the next step.

Next, as shown in block 406, the method includes prompting the user computing device to digitally sign a data record on a distributed ledger using a private key associated with the user, the data record comprising a reference to a transferee NFT on the distributed ledger. In some embodiments, the transferee NFT may be an NFT that comprises a matching transferee identifier to the transferee identifier obtained from the user computing device. Accordingly, by digitally signing a data record comprising a reference to the transferee NFT using the same private key that was used to generate the transferee NFT, the user may be authenticated as an authorized user.

Next, as shown in block 408, the method includes performing verification of the data record by decrypting the data record using a public key corresponding to the private key. If the system is unable to decrypt the data record, the system may determine that the data record was not encrypted using the private key associated with the authorized transferee, and determine that the user is not authorized to execute the resource transfer. Subsequently, the system may execute the remediation processes described elsewhere herein. If the system is able to decrypt the data record, the system may determine that the data record was encrypted using the private key, and move on to the next step.

Next, as shown in block 410, the method includes validating the data and metadata associated with the resource transfer and the user based on the information stored in the transferee NFT. Upon decrypting the data record, the system may access the information in the transferee NFT to perform the authentication of the user. In particular, validating the data and metadata may comprise comparing the transferee identifier within the data and metadata with the information (e.g., transferee identifier) within the transferee NFT. If a match is detected, the system may determine that the user is an authorized transferee of the resource, and subsequently execute the resource transfer according to the parameters specified in the resource transfer request. However, if no match is detected, the system may determine that the user is not an authorized transferee of the resource and subsequently execute one or more of the remediation processes herein.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 14548US1.014033.4640 | 18/201,420 | SYSTEM AND METHOD FOR AUTHENTICATION OF RESOURCE TRANSFERS USING TOKENIZATION AS INDICATOR OF AUTHORIZED RESOURCE DISTRIBUTION | Filed concurrently herewith |
| 14549US1.014033.4641 | 18/201,424 | SYSTEM AND METHOD FOR AUTHENTICATION USING TOKENIZATION OF A RESOURCE PRIOR TO RESOURCE ALLOCATION | Filed currently herewith |
| 14552US1.014033.4643 | 18/201,570 | SYSTEM AND METHOD FOR PROCESSING A RESOURCE TRANSFER BETWEEN A SIMULATED AND REAL ENVIRONMENT | Filed currently herewith |
| 14553US1.014033.4644 | 18/201,593 | SYSTEM AND METHOD FOR GENERATION AND MONITORING OF UNIQUE DISTRIBUTED TOKEN FOR RESOURCE VERIFICATION | Filed currently herewith |
| 14551US1.014033.4646 | 18/201,336 | SYSTEM AND METHOD FOR SELF-AUTHENTICATING A TRANSFER REQUEST WITHIN AN ELECTRONIC NETWORK | Filed currently herewith |

What is claimed is:

1. A system for authentication of a resource transfer target after resource allocation, wherein the system is structured for maintaining resource security while structuring granular control of a resource transfer, the system comprising:
 a processing device;
 a non-transitory storage device containing instructions when executed by the processing device, causes the processing device to perform the steps of:
  determining an initiation, via a user computing device of a user as a transferee, of a request within a virtual environment to execute a resource transfer of a resource, wherein a resource NFT associated with the resource is generated and stored on a distributed ledger, wherein determining the initiation of the request comprises identifying that the user has selected a virtual representation of the resource within the virtual environment;
  receiving data and metadata associated with the resource transfer and the user, the data and metadata comprising a transferee identifier of the user and a resource identifier of the resource;
  generating an asymmetric cryptographic key pair associated with a cryptographic address of the user, wherein the asymmetric cryptographic key pair comprises a private key structured for exclusive use by the user and a public key structured for transmission;
  prompting the user computing device to digitally sign a data record on a distributed ledger using the private key associated with the user, the data record comprising a reference to a transferee NFT associated with the user on the distributed ledger;

performing verification of the data record by decrypting the data record using the public key associated with the cryptographic address of the user corresponding to the private key;
  searching the distributed ledger for the transferee NFT using the transferee identifier and the resource NFT using the resource identifier;
  authenticating the resource associated with the resource transfer based on at least metadata associated with the resource, wherein the metadata associated with the resource is located within the resource NFT associated with the resource, wherein the authentication of the resource comprises (i) determining the resource identifier located within the resource NFT of the resource, wherein the resource identifier comprises a cryptographic hash value associated with the resource, and (ii) performing on-chain verification of the resource identifier based on comparing the cryptographic hash value of the resource identifier with values of authorized resources stored on the distributed ledger; and
  validating the data and metadata associated with the resource transfer and the user based on information stored in the transferee NFT.

2. The system of claim 1, wherein validating the data and metadata comprises:
 detecting a match between the transferee identifier comprised in the request with the information stored within the transferee NFT; and
 executing the resource transfer by facilitating transfer of the resource according to one or more parameters specified within the request to execute the resource transfer.

3. The system of claim 1, wherein validating the data and metadata comprises:
 detecting a mismatch between the transferee identifier with the information stored within the transferee NFT;
 executing one or more remediation processes, the one or more remediation processes comprising blocking the resource transfer; and
 rejecting data records submitted from the user.

4. The system of claim 3, wherein the one or more remediation processes comprises transmitting a notification to the user computing device, the notification comprising an indication that the user is not authorized to execute the resource transfer.

5. The system of claim 1, wherein determining the initiation of the request within the virtual environment to execute the resource transfer further comprises:
   identifying that the user has selected the virtual representation of the resource within the virtual environment; and
   detecting that the user has interacted with a selectable element of the virtual representation of the resource within the virtual environment.

6. The system of claim 5, wherein the selectable element as a virtual button appearing proximate to the virtual representation of the resource.

7. The system of claim 1, wherein the data and metadata further comprise transaction timestamp, and a transferee address.

8. A computer program product for authentication of a resource transfer target after resource allocation, wherein the computer program product is structured for maintaining resource security while structuring granular control of a resource transfer, the computer program product comprising a non-transitory computer-readable medium storing code instructions that, when executed by a processor of an apparatus, cause the processor to perform the steps of:
   determining an initiation, via a user computing device of a user as a transferee, of a request within a virtual environment to execute a resource transfer of a resource, wherein a resource NFT associated with the resource is generated and stored on a distributed ledger, wherein determining the initiation of the request comprises identifying that the user has selected a virtual representation of the resource within the virtual environment;
   receiving data and metadata associated with the resource transfer and the user, the data and metadata comprising a transferee identifier of the user and a resource identifier of the resource;
   generating an asymmetric cryptographic key pair associated with a cryptographic address of the user, wherein the asymmetric cryptographic key pair comprises a private key structured for exclusive use by the user and a public key structured for transmission;
   prompting the user computing device to digitally sign a data record on a distributed ledger using the private key associated with the user, the data record comprising a reference to a transferee NFT associated with the user on the distributed ledger;
   performing verification of the data record by decrypting the data record using the public key associated with the cryptographic address of the user corresponding to the private key;
   searching the distributed ledger for the transferee NFT using the transferee identifier and the resource NFT using the resource identifier;
   authenticating the resource associated with the resource transfer based on at least metadata associated with the resource, wherein the metadata associated with the resource is located within the resource NFT associated with the resource, wherein the authentication of the resource comprises (i) determining the resource identifier located within the resource NFT of the resource, wherein the resource identifier comprises a cryptographic hash value associated with the resource, and (ii) performing on-chain verification of the resource identifier based on comparing the cryptographic hash value of the resource identifier with values of authorized resources stored on the distributed ledger; and
validating the data and metadata associated with the resource transfer and the user based on information stored in the transferee NFT.

9. The computer program product of claim 8, wherein validating the data and metadata comprises:
   detecting a match between the transferee identifier with the information stored within the transferee NFT; and
   executing the resource transfer by facilitating transfer of the resource according to one or more parameters specified within the request to execute the resource transfer.

10. The computer program product of claim 8, wherein validating the data and metadata comprises:
   detecting a mismatch between the transferee identifier with the information stored within the transferee NFT;
   executing one or more remediation processes, the one or more remediation processes comprising blocking the resource transfer; and
   rejecting data records submitted from the user.

11. The computer program product of claim 10, wherein the one or more remediation processes comprises transmitting a notification to the user computing device, the notification comprising an indication that the user is not authorized to execute the resource transfer.

12. The computer program product of claim 8, wherein determining the initiation of the request within the virtual environment to execute the resource transfer further comprises:
   identifying that the user has selected the virtual representation of the resource within the virtual environment; and
   detecting that the user has interacted with a selectable element of a virtual representation of the resource within the virtual environment.

13. The computer program product of claim 12, wherein the selectable element as a virtual button appearing proximate to the virtual representation of the resource.

14. A computer-implemented method for authentication of a resource transfer target after resource allocation, wherein the computer-implemented method is structured for maintaining resource security while structuring granular control of a resource transfer, the computer-implemented method comprising steps performed by an apparatus:
   determining an initiation, via a user computing device of a user as a transferee, of a request within a virtual environment to execute a resource transfer of a resource, wherein a resource NFT associated with the resource is generated and stored on a distributed ledger, wherein determining the initiation of the request comprises identifying that the user has selected a virtual representation of the resource within the virtual environment;
   receiving data and metadata associated with the resource transfer and the user, the data and metadata comprising a transferee identifier of the user and a resource identifier of the resource;
   generating an asymmetric cryptographic key pair associated with a cryptographic address of the user, wherein the asymmetric cryptographic key pair comprises a private key structured for exclusive use by the user and a public key structured for transmission;
   prompting the user computing device to digitally sign a data record on the distributed ledger using the private key associated with the user, the data record comprising a reference to a transferee NFT associated with the user on the distributed ledger;

performing verification of the data record by decrypting the data record using the public key associated with the cryptographic address of the user corresponding to the private key;

searching the distributed ledger for the transferee NFT using the transferee identifier and the resource NFT using the resource identifier;

authenticating the resource associated with the resource transfer based on at least metadata associated with the resource, wherein the metadata associated with the resource is located within the resource NFT associated with the resource, wherein the authentication of the resource comprises (i) determining the resource identifier located within the resource NFT of the resource, wherein the resource identifier comprises a cryptographic hash value associated with the resource, and (ii) performing on-chain verification of the resource identifier based on comparing the cryptographic hash value of the resource identifier with values of authorized resources stored on the distributed ledger; and validating the data and metadata associated with the resource transfer and the user based on information stored in the transferee NFT.

15. The computer-implemented method of claim 14, wherein validating the data and metadata comprises:

detecting a match between the transferee identifier with the information stored within the transferee NFT; and executing the resource transfer by facilitating transfer of the resource according to one or more parameters specified within the request to execute the resource transfer.

16. The computer-implemented method of claim 14, wherein validating the data and metadata comprises:

detecting a mismatch between the transferee identifier with the information stored within the transferee NFT;

executing one or more remediation processes, the one or more remediation processes comprising blocking the resource transfer; and rejecting data records submitted from the user.

17. The computer-implemented method of claim 16, wherein the one or more remediation processes comprises transmitting a notification to the user computing device, the notification comprising an indication that the user is not authorized to execute the resource transfer.

18. The computer-implemented method of claim 14, wherein determining the initiation of the request within the virtual environment to execute the resource transfer further comprises:

identifying that the user has selected the virtual representation of the resource within the virtual environment; and detecting that the user has interacted with a selectable element of a virtual representation of the resource within the virtual environment.

19. The computer-implemented method of claim 18, wherein the selectable element as a virtual button appearing proximate to the virtual representation of the resource.

20. The computer-implemented method of claim 14, wherein the data and metadata further comprise transaction timestamp, and a transferee address.

\* \* \* \* \*